Nov. 12, 1968  G. DION-BIRO  3,410,493
FIXED JOINTED NOZZLES

Filed May 3, 1965  3 Sheets-Sheet 1

Inventor
Guy Dion-Biro
by Michael J. Striker
Atty

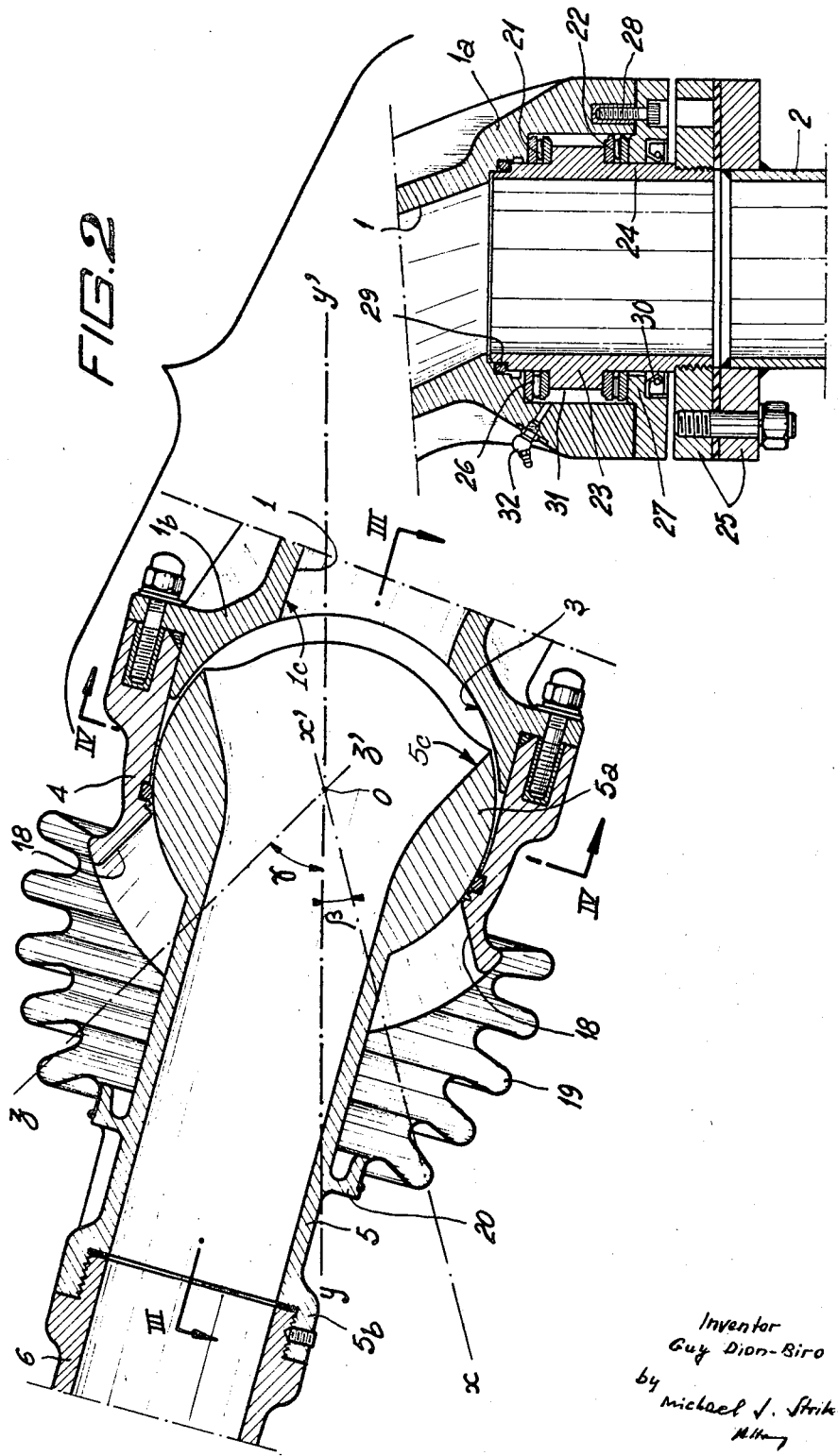

Nov. 12, 1968    G. DION-BIRO    3,410,493
FIXED JOINTED NOZZLES
Filed May 3, 1965    3 Sheets-Sheet 3
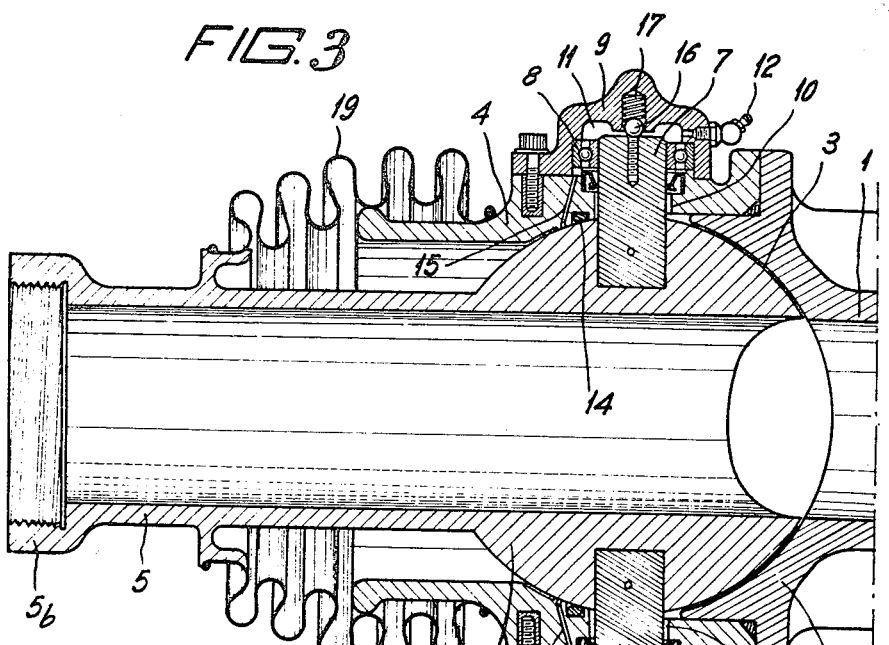
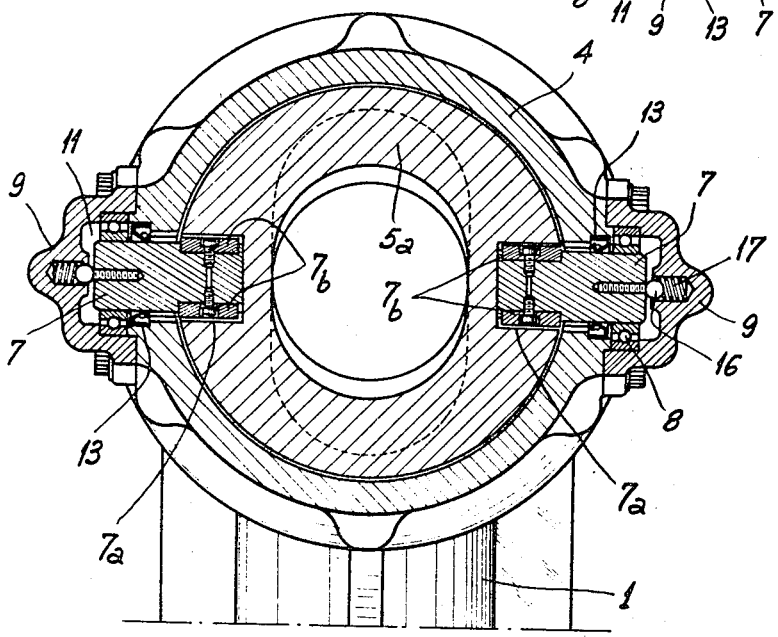
Inventor
Guy Dion-Biro
by Michael J. Striker United States Patent Office 3,410,493
Patented Nov. 12, 1968

3,410,493
FIXED JOINTED NOZZLES
Guy Dion-Biro, 82 Rue de Silly,
Boulogne-sur-Seine, France
Filed May 3, 1965, Ser. No. 452,526
Claims priority, application France, May 5, 1964,
973,315
1 Claim. (Cl. 239—587)

ABSTRACT OF THE DISCLOSURE

An adjustable nozzle wherein a pair of tubes are connected at adjacent ends for limited universal tilting movement to each other in such a manner so as to provide in each position of the tubes relative to each other unrestricted, substantially turbulence-free flow of fluid therethrough, and in which one of the tubes is sealingly connected at its other end to a socket so as to permit this one tube to turn easily about the axis of the socket.

---

The present invention relates to large-sectioned fixed nozzles designed for throwing out water, foam or pulverulent products. More particularly, this invention relates to turret nozzles comprising two coupling devices permitting the one a 360-degree horizontal rotation on a fixed turret of the nozzle and the other a vertical movement of the nozzle end both above and beneath the horizontal. Nozzles of this type are suitable for use as fire nozzles or spray nozzles in fields and miscellaneous agricultural applications. However, hitherto known nozzles of this character suffer from a number of inconveniences.

A first type of nozzle of this character called "monitor nozzle" consists of a projecting tube formed with two lateral flanges having a common horizontal axis, which are rotatably mounted on a pair of tubular columns curved to a half-circular configuration, disposed in a same vertical plane and secured to a vertical socket closed at its upped end. This socket is mounted on the stationary turret or support of the nozzle by means of a joint system permitting a 360-degree horizontal movement. Thus, the spray tube may be oriented in the different desired directions.

However, the presence of two lateral curved columns involves considerable losses of pressure for the path followed by the fluid under pressure comprises several successive oppositely-directed elbows. On the other hand, detrimental eddies develop within the spray tube due to the fact that the two lateral columns open in front of each other and that the fluid must subsequently be projected forwards.

Another turret type fire nozzle of the general character set forth hereinabove consists of a tube having a first elbow disposed at right angles in a vertical plane, then of a second elbow also at right angles but in a horizontal plane. This tube is divided into two elements connected in the horizontal section following the first elbow. At this junction there is provided between the two members of the nozzle a coupling permitting of orienting the nozzle end in a vertical plane. The lower end of this nozzle is mounted on the other hand on swivel means permitting a horizontal rotation through 360 degrees.

In this second type of nozzle the loss of pressure is reduced very considerably with respect to that experienced in nozzles of the aforesaid monitor type. However, due to the specific configuration of this second type of nozzle the outlet end of the nozzle is somewhat shifted laterally. Now this shift is such that when the nozzle is used for projecting a fire-extinguishing product a very powerful torque is produced. Due to the magnitude of this effect the operator is practically unable to hold the nozzle by himself in the desired position.

Therefore, some complementary mechanical means adapted to permit their practical utilization must be provided on these nozzles. To this end, a mechanical device is provided as a rule at their vertical hinge point. As to their horizontal swivel means they generally comprise a worm gear whereby the nozzle can be moved during its operation by exerting a reasonable effort. This last-mentioned arrangement introduces a gear reduction in the movements so as to lighten the necessary efforts, but it is obviously objectionable in that it increases considerably the time necessary for operating the nozzle. Under these conditions this nozzle cannot be used efficiently for spraying a fire-extinguishing product onto a rapidly expanding fire, as in the case of fires caused by the ignition of gas or hydrocarbon products.

Therefore, it is the object of this invention to provide an improved turret nozzle arrangement of the general type set forth hereinabove which is however free of the inconveniences characterizing hitherto known constructions. More particularly, it is the scope of this invention to reduce the magnitude of the loss of pressure occuring in a nozzle of this type while permitting an easy and rapid operation of the nozzle without resorting to additional mechanical means for accomplishing this manoeuvre.

The fire-nozzle according to this invention consists essentially of a tube broadly bent in a vertical plane and of which the lower vertically extending section is mounted on a swivel permitting a horizontal 360-degree rotation, the upper section of this tube, which is slightly raised above the horizontal, comprising at its outer end a spherical cavity having rotatably mounted therein the ball-shaped end of another tube carrying the nozzle outlet piece. This last tube is pivotally mounted by means of a pair of horizontal trunnions fitting in bearings carried by the spherical cavity formed in the upper end of the first tube so as to permit the pivoting movements of this second tube in a vertical plane both above and beneath the horizontal.

A specific form of embodiment of the fire nozzle according to this invention is described hereinafter by way of example, with reference to the attached drawings. In the drawings:

FIGURE 2 is a fragmentary axial section taken upon a vertical plane on a different scale, and FIGURES 3 and 4 are fragmentary sectional views taken respectively upon the lines III—III and IV—IV of FIGURE 2.

Figure 1:
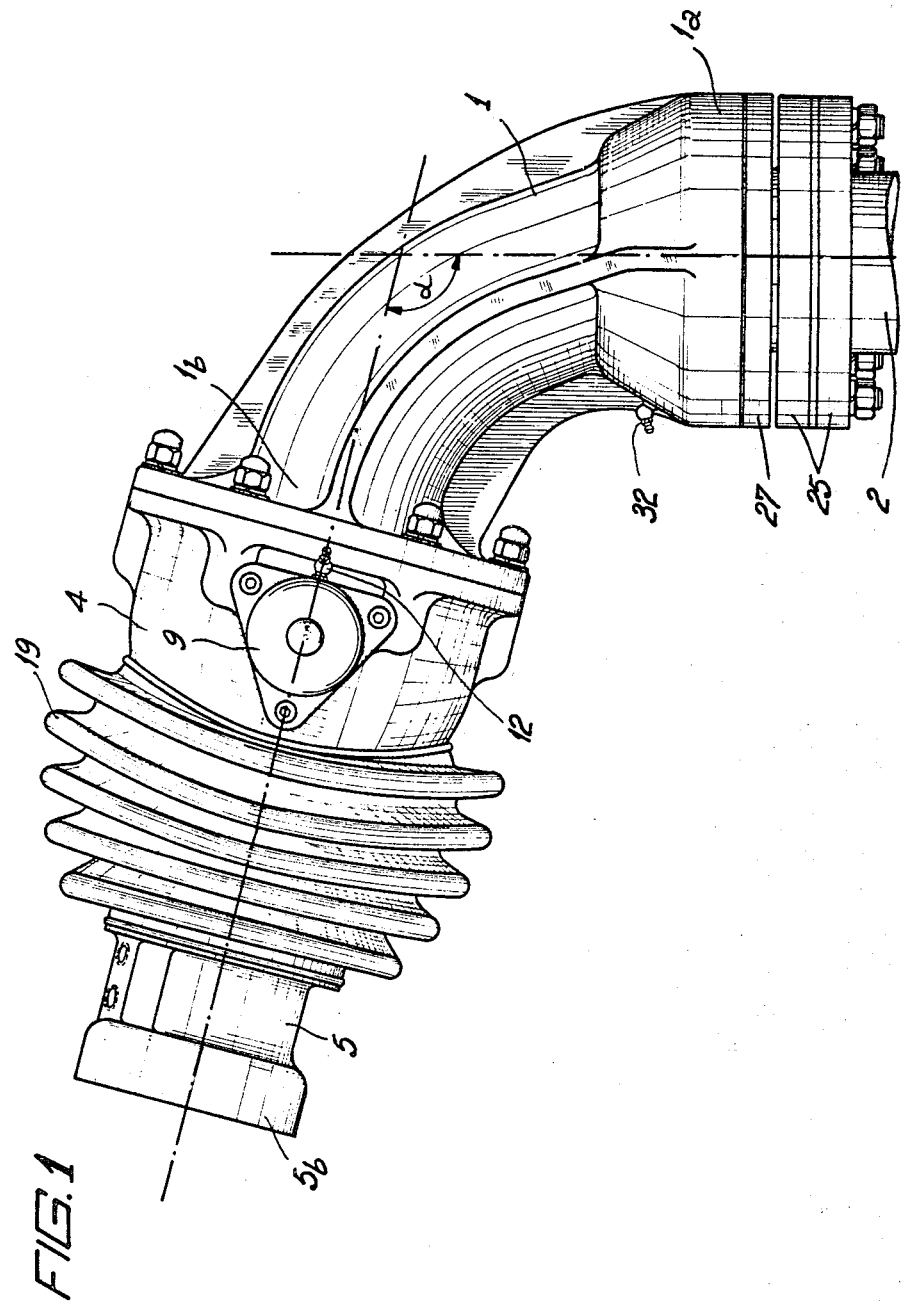
FIGURE 1 is a side elevational view of a nozzle constructed according to this invention.

The nozzle illustrated in the drawings consists of a first tube 1 broadly curved in a vertical plane. Thus the axes of the lower section 1a and the upper section 1b of this first tube form therebetween an angle α which may have a value of about 100 to 110°. The lower section 1a of this tube is normally disposed vertically and mounted on the fixed turret or base 2 of the nozzle by means of a coupling or joint device to be described presently, which permit a 360-degree swivel movement of this section in a horizontal plane.

The upper extremity of the first tube carries a collar 1b' fixed thereto having an inner spherical surface. The outlet opening 1c of the tube 1 has the same cross section as the reminder of the tube 1. A ring-shaped insert 4 is secured to the collar 1b' and forms with the latter a spherical cavity 3. In the thus formed spherical recess the ball-shaped end 5a of a second rectilinear tube 5 is fitted, the other or free end 5b of this second tube carrying the spray or outlet piece 6 of the nozzle. The inlet opening 5c of the rectilinear tube 5 is arranged in close proximity to the outlet opening 1c of the tube 1 and the inner surface of the tube 5 flares toward the inlet opening 5c.

The ball-shaped end 5a is pivotally mounted in the spherical cavity by means of a pair of horizontal trunnions 7 rotatably mounted in ball-bearings 8 carried by the ring-shaped insert 4. Each trunnion 7 engages with a certain free play the corresponding recess 7a formed in the ball-shaped end 5a. A pair of keys 7b cause this ball-shaped end 5a to revolve bodily with each trunnion.

Each ball-bearing 8 is mounted in a cap 9 secured on the corresponding side of the ring-shaped member 4 so as to register with a bore 10 permitting the passage of the relevant trunnion 7 therethrough. Each cap 9 will thus form about the corresponding ball-bearing 8 a chamber 11 adapted to act as a lubricating chamber for this bearing. For this purpose each cap 9 is formed with a grease duct provided at its outer end with a grease nipple 12 adapted to be connected to a suitable grease dispenser. A packing 13 surrounds the end of each trunnion 7 to prevent the grease from entering the cavity of trunnion 5a and become mixed with the fluid circulated within the nozzle.

Another packing 14 disposed between the ball-shaped end 5a and the inner wall of its recess consists of an O-ring fitted in a groove formed to this end in said inner wall downstream of the trunnions 7. Within the ring-shaped insert 4 a pair of small ducts 15 leading from each lubricating chamber 11 to the inner space of the recess receiving the ball-shaped end 5a are provided. In this respect it may be noted that these two small ducts open downstream of the O-ring 14. Thus, the contact surfaces of ball-shaped end 5a and of the inner wall of its cavity are properly lubricated through these grease ducts 15, the O-ring 14 preventing the grease thus supplied to these surfaces from flowing backwards and becoming mixed with the fluid flowing through the nozzle. Under these conditions, the packing ring 14 is lubricated and cannot harden with time, as this would finally jam the jointed tube 5.

Each cap further encloses a spring-loaded member exerting a resilient pressure against the relevant trunnion 7; this spring-loaded member may consist of a ball 16 urged by a compression coil spring 17. The function of these two resilient members is to center the ball-shaped end 5a in relation to the O-ring 14, and also to keep the trunnions 7 in their respective recesses.

The inner wall of ring-shaped insert 4 is formed at its front end with a pair of outflaring notches 18 disposed respectively at the top and bottom of the insert (see FIGURE 2). The purpose of these flared notches is to permit the upward or downward pivoting movements of the second tube 5 about the axis O of its trunnions 7. Thus, the tube 5 may be inclined below the horizontal to an end position in which its axis $xx'$ forms an angle $\beta$ to the horizontal $yy'$.

On the other hand, this tube may be inclined upwards to an end position in which its axis is coincident with the line $zz'$ forming an angle $\gamma$ to the horizontal $yy'$. This angle $\gamma$ may have a value of the order of about 50°, the angle $\beta$ having on the other hand a value of the order of 15°. In the whole, the tube 5 may be adjusted vertically through an angle of about 65 degrees. This permissible angular adjustment is amply sufficient for the applications contemplated of the nozzle of this invention.

A fluid-tight sleeve 19 of adequate flexible material such as rubber is fitted between the front end of ring-shaped insert 4 and a collar 20 carried by the front end of tube 5. Preferably, this sleeve is of bellows configuration to increase its flexibility and avoid any interference whatsoever with the pivoting and swivelling movements of tube 5.

The swivel means provided at the lower end of this nozzle, that is, at the lower end 1a of the curved tube 1, consists essentially of a pair of ball- or roller-bearings 21, 22 disposed on either side of a collar 23 formed integrally on a socket 24 rigidly assembled with the fixed turret 2. This socket may be secured on the turret 2 by means of flanges 25 assembled by screw and nut means.

The lower end 1a of the bent tube 1 is fitted on the two bearings 21, 22 and bears on the upper bearing 21 by means of a suitable shoulder 26 formed on its inner wall. On the other hand, the lower bearing 22 bears on a washer 27 forming an insert on the lower end face of tube 1 to which it is secured by means of screws 28. Thus the nozzle bears on the fixed turret 2 through the bearings 21, 22 permitting a 360-degree swivelling of this nozzle in a horizontal plane.

An annular packing or O-ring 29 is fitted between the upper end of the fixed socket 24 and the corresponding portion of the inner wall of tube 1. Another packing 30 of substantially annular configuration is disposed between the washer 27 and the lower portion of the inner wall of said fixed socket 24. Thus, the lower end of the bent tube 1 constitutes a lubricating chamber 31 about the bearings 21 and 22. This end is provided of course with ducts for introducing the grease, with a grease nipple 32 at the outer end of the duct for connecting same to a suitable grease dispensing apparatus.

Under these conditions the bearings 21 and 22 are constantly lubricated, thus avoiding any risk of untimely jamming of the nozzle on its turret. On the other hand, with this arrangement it is possible to expel any foreign substances having penetrated into the joint device in spite of the presence of packings 29, 30 therein. In fact, it is only necessary to inject grease through the nipple 32 until a certain amount thereof is forced down to the level of packing 30.

It will be seen that the nozzle of this invention is free of the drawbacks characterizing hitherto known large-diameter nozzles comprising a double joint system permitting their angular adjustment in both vertical and horizontal planes. In effect, the losses of pressure likely to be experienced with a nozzle constructed according to the teachings of this invention are quite moderate since it comprises only one bend of relatively large radius. Moreover, this nozzle is free of any elbow capable of producing during its operation a torque effect making its operation uneasy. Therefore, this nozzle can be operated very easily and rapidly by a single operator who can also alter at will the orientation of the nozzle outlet during its utilization. It may also be noted that the nozzle end may be provided with a lever carrying a balance weight for holding the nozzle automatically in the desired angular position of this end.

Of course, the facility of manoeuvre of the nozzle is increased by the fact that the two swivel or joint means are both provided with ball- or roller-bearings. Moreover, the nozzle according to this invention is free of any risk of jamming the movable members thereof. Besides, the various component elements of this nozzle can be easily disassembled due to the design characteristics of the assembly.

It will be readily understood by anybody conversant with the art, a nozzle outlet piece 6 of any desired type may be fitted on the front pivoted tube 5 according to the specific use for which the nozzle is intended, and to the nature of the products to be sprayed therethrough. On the other hand, it is obvious that the nozzle according to this invention should not be construed as being limited by the specific form of embodiment shown and described herein by way of example, since many modifications and variations may be brought thereto without departing from the spirit and scope of the invention as set forth in the appended claims.

I claim:

1. An adjustable nozzle comprising, in combination, a first tube having an upper outlet end of a predetermined inner diameter and a lower tube portion having a bottom end portion of a larger diameter than the remainder of said lower tube portion to form a downwardly facing first shoulder; inwardly extending flange means fixed to the bottom end of said first tube and forming a second shoulder spaced from and facing said first shoulder; joint means at said outlet end of said first tube and having an inner part-spherical surface, said outlet end of said first tube communicating with the interior of said joint means; a second tube having a ball-shaped end projecting into the interior of said joint means and having an outer part-spherical surface located closely adjacent said inner part-spherical surface of said joint means, said second tube having an inlet end in said joint means, the inner surface of said second tube flaring outwardly in at least one direction so that at least in said one direction the diameter of said inner surface at said inlet end of said second tube is larger than said predetermined diameter of said outlet end of said first tube; pivot means on said joint means and said ball-shaped end for mounting said second tube tiltably with respect to said first tube about an axis transverse to said one direction; substantially vertical socket means; and swivel joint means connecting the bottom end of said lower tube portion of said first tube to said socket means turnably about the axis of the latter, said swivel joint means comprising a portion of said socket means projecting into said large diameter end portion and forming a pair of shoulders respectively spaced from and facing said first and said second shoulder, a pair of anti-friction bearing means respectively located in the spaces between said first and second shoulders and said pair of shoulders on said socket means, a pair of annular sealing means about said portion of said socket means and respectively arranged above and below said bearing means, and passage means communicating between said pair of annular sealing means with the interior of said large diameter end portion for feeding lubricating material thereinto.

References Cited

UNITED STATES PATENTS

| | | | |
|---|---|---|---|
| 245,007 | 8/1881 | Morse | 285—264 X |
| 1,963,368 | 6/1934 | Johnson. | |
| 984,557 | 2/1911 | Gorter | 285—264 |
| 2,655,391 | 10/1953 | Atkins | 285—94 X |
| 2,816,799 | 12/1957 | English | 239—587 X |
| 3,048,977 | 8/1962 | Geary | 285—264 X |
| 3,315,370 | 12/1962 | Bammann | 239—587 |

FOREIGN PATENTS

| | | |
|---|---|---|
| 1,160,791 | 1/1964 | Germany. |

M. HENSON WOOD, JR., *Primary Examiner.*

V. M. WIGMAN, *Assistant Examiner.*